(12) United States Patent
Yoshida

(10) Patent No.: US 6,667,822 B2
(45) Date of Patent: Dec. 23, 2003

(54) SCANNING OPTICAL SYSTEM AND IMAGE FORMING APPARATUS USING THE SAME

(75) Inventor: Hiroki Yoshida, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 09/922,648

(22) Filed: Aug. 7, 2001

(65) Prior Publication Data

US 2002/0039223 A1 Apr. 4, 2002

(30) Foreign Application Priority Data

Aug. 10, 2000 (JP) .......................................... 2000-242837

(51) Int. Cl.$^7$ ............................................... G02B 26/08
(52) U.S. Cl. ........................ 359/207; 359/204; 359/205; 359/216; 347/244; 347/259
(58) Field of Search ................................. 359/204–219, 359/662, 708, 713–718; 347/241, 243, 244, 258, 259, 261

(56) References Cited

U.S. PATENT DOCUMENTS 5,737,112 A * 4/1998 Iizuka ......................... 359/205
5,757,533 A * 5/1998 Ota ............................. 359/205
6,256,132 B1 * 7/2001 Ishibe ......................... 359/204

FOREIGN PATENT DOCUMENTS

JP          9-54263        2/1997

* cited by examiner

Primary Examiner—James Phan
(74) Attorney, Agent, or Firm—Fitzpatrick, Cella, Harper & Scinto

(57) ABSTRACT

A scanning optical system less subject to the effect of decentering of an optical element and having improved optical performance on a scanning surface is provided. The ratio of Ra and Rs satisfies the condition of 0.8<Ra/Rs<1.2 over a full effective scanning area, where Ra represents a radius of curvature in a sub scan sectional plane of a rotationally asymmetrical, anamorphically aspherical surface and Rs represents a radius of curvature in the sub scan sectional plane of a rotationally symmetrical surface that results if a generatrix of the rotationally asymmetrical, anamorphically aspherical surface is rotated about an optical axis.

13 Claims, 19 Drawing Sheets

SCANNING OPTICAL SYSTEM AND IMAGE FORMING APPARATUS USING THE SAME

BACKGROUND OF THE INVENTION

1. Field of the Invention

The present invention relates to a scanning optical system which is for use in a laser beam printer or a digital copying apparatus, and causes a light beam emitted from a light source to scan a scanning surface, and also relates to a digital beam forming apparatus incorporating the scanning optical system.

2. Description of the Related Art

A scanning optical system used in conventional image forming apparatuses is designed so that a light beam emitted from a light source is guided to a deflector through an incident optical unit, and the light beam deflected from the deflector is focused into a spot while being scanned on a scanning surface through a scanning optical unit.

The scanning optical system includes one or more optical elements. When these optical elements are decentered, an actual focused position of an image become shifted from a correct focused position. For example, a resulting image is bent in a sub scan direction, thereby degrading printed image.

A plurality of light source elements may be employed in a scanning optical system. For example, Japanese Unexamined Patent Application Publication No. 9-54263 discloses a multi-beam laser chip as a light source which emits a plurality of laser light beams arranged in a single line. When the optical elements are decentered, not only the focused position is generally deviated, but also the relative positional relationship between focused positions of light source elements is changed. The quality of printed image is adversely affected more when a plurality of light source elements are used than when a single light source is used.

To reduce image degradation, tolerances of the optical element itself and tolerances of the mounting position of the optical element during manufacture need to be reduced. Such an attempt is subject to limitation. Even if tolerances are reduced, manufacturing such a scanning optical element is difficult. The manufacturing yield thereof drops, leading cost increases.

Lenses are preferably shaped in a configuration that is less subject to the effect of decentering. Specifically, each lens preferably has a rotationally symmetrical optical surface. Such an optical surface does not affect print quality at all even when the optical surface is decentered from an optical axis. Even when the optical surface rotates about an axis parallel to the main scan direction, a deviation of a focused position with respect to the sub scan direction is substantially constant over an entire scanning range. Compared with the rotationally asymmetrical optical surface, print quality is less subject to degradation.

Several scanning optical systems have been proposed which use an optically aspherical surface or a rotationally symmetrical, aspherical surface as an optical surface in a scanning optical unit. These proposals are proposed on the assumption that the material in use is glass. An optical element constituting a scanning optical unit is typically larger in size than those used in other devices. If the optical element is manufactured of optical glass, manufacturing costs thereof is likely to increase. The use of a resin material is preferred from the standpoint of costs. Since the optical element manufactured of a resin is typically produced using a molding technique, a further cost reduction is expected because optical glass requires cutting and polishing processes. Since the resin optical element is shaped into a complex configuration, which could not be applied to optical glass, the count of optical elements is reduced. This further reduces costs of the scanning optical unit.

When an optical element is manufactured using a molding technique, a mirror surface of a die is typically corrected to set the shape of the optical surface of the optical element to designed values, and to planarize an image plane. When the optical element is pulled out from the die, the optical element suffers from a deformation such as a shrinkage because of a temperature difference between an ambient air and the die. The mirror surface of the die needs correcting to offset the deformation. If the outline of the optical element is rectangular or nearly rectangular rather than being round, the lens suffers from a difference in shrinkage rate between the long axis and the short axis. When the optical surface of the optical element is formed to be strictly rotationally symmetrical, the mirror surface of the die needs machining with the rotationally symmetrical structure anamorphically corrected. While the rotationally symmetrical shape is defined in the rotating coordinate system, the anamorphic structure is defined in the rectangular coordinate system. Both structures are thus expressed using different coordinate systems. It is thus difficult to determine a desired configuration to be applied to the mirror surface of the die. Even if such a configuration is determined, a resulting equation thereof is expected to be abstruse. Eve if the equation is implemented in correction, an error may be introduced in the actual machining.

The optical elements used in the scanning optical unit are typically rectangular or generally rectangular, and for this reason, introducing a rotationally symmetrical shape into the optical element is rather difficult.

Too much dependency on the rotationally symmetrical optical surface in design increases design limitations, thereby reducing performance of the scanning optical system, in contrast with the case in which an anamorphical surface is introduced. The number of lenses sometimes need to be increased to obtain required performance. Such a situation is undesirable from the standpoint of costs. Particularly, when there are a plurality of light source elements, a degradation in print quality results because the positional relationship between focused positions changes during scanning. High standards are required of the uniformity of sub scan magnification and the flatness of the curvature of field, compared with the case in which a single light source is used. When the sub scan magnification is not uniform over an entire scanning range, scanning lines are spaced apart more or less in the sub scan direction depending on a scan position. When the curvature of field is not flat, the positional relationship in the main scan direction is destroyed during scanning even if the spots of the light source elements are aligned at the start of writing. Print quality is thus degraded in the course of scanning when the focused positions of the light beams of the light source elements shift.

SUMMARY OF THE INVENTION

Accordingly, it is an object of the present invention to provide a low-cost scanning optical system which is made less subject to degradation in print quality by reducing the effect of the decentering of an optical element. It is also an object of the present invention to provide an image forming apparatus incorporating the scanning optical system.

The present invention relates to a scanning optical system and includes at least one light source, incident optical unit for guiding a light beam from the light source to deflector, the deflector for deflecting the light beam, a scanning optical unit, having at least one optical element, for scanning and focusing the light beam, deflected by the deflector, on a scanning surface. At least one surface of the optical element forming the scanning optical unit is an anamorphically aspherical surface in a main scan sectional plane. The relationship of 0.8<Ra/Rs<1.2 holds over an entire scanning range, where Ra represents a radius of curvature in a sub scan sectional plane of a surface which is anamorphically aspherical in a main scan sectional plane, and Rs represents a radius of curvature in a sub scan sectional plane of a surface that results if a generatrix of the surface, which is anamorphically aspherical in the main scan sectional plane, is rotated about an optical axis by 360 degrees.

Preferably, the radius of curvature Ra in the sub scan direction within a distance of 15 mm in a main scan direction from the optical axis satisfies the condition of 0.95<Ra/Rs<1.05.

The optical element having an anamorphically aspherical surface in the main scan sectional plane may be produced through a molding technique.

The optical element having an anamorphically aspherical surface in the main scan sectional plane may be a lens.

The lens having an anamorphically aspherical surface in the main scan sectional plane may be fabricated of a resin material.

The anamorphically aspherical surface in the main scan plane may be a surface of the lens of the scanning optical unit facing the deflector.

The scanning optical unit may include a plurality of lenses, at least one of which has the anamorphically aspherical surface in the main scan sectional plane.

The one of the lenses constituting the scanning optical unit and closet to the deflector preferably has the anamorphically aspherical surface in the main scan sectional plane.

The light source preferably includes one or more light source elements.

The present invention in another aspect relates to an image forming apparatus and includes the scanning optical system, a photoconductive body arranged on a scanning surface, a development unit which develops, into a toner image, an electrostatic latent image which is formed on the photoconductive body through a light beam scanned through the scanning optical system, a transfer unit which transfers the developed toner image to a sheet member, and a fixing unit which fixes the transferred image onto the sheet member.

The present invention in yet another aspect relates to an image forming apparatus and includes the scanning optical system, and a printer controller which converts code data received from an external device into an image signal and then inputs the picture signal to the scanning optical system.

In accordance with the present invention, a curvature radius Ra in a sub scan sectional plane and a curvature radius Rs corresponding to a radius of curvature in a main scan sectional plane are not equal to each other. But if the difference between the two radii is too large, the effect of the decentered optical element becomes pronounced on the scanning surface. To reduce that effect, the difference is controlled to within a predetermined value. Since the curvature radius Ra in the sub scan sectional plane and the curvature radius Rs corresponding to the radius of curvature in the main scan sectional plane are not equal to each other, design flexibility is increased, and performance of the scanning optical system is improved. Lens design thus becomes easier.

Further objects, features, and advantages of the present invention will be apparent from the following description of the preferred embodiments with reference to the attached drawings.

DESCRIPTION OF THE PREFERRED EMBODIMENTS

First Embodiment

Figure 1:
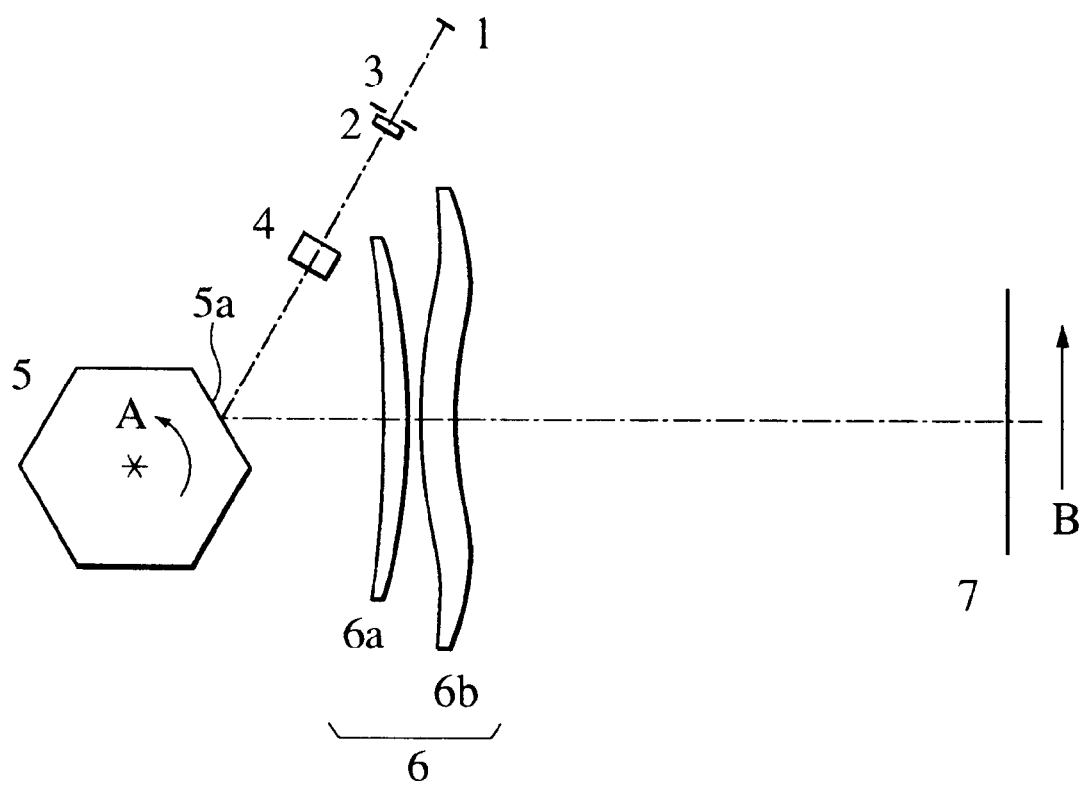
FIG. 1 is a cross-sectional view showing a major portion of a scanning optical system of a first embodiment of the present invention, taken in a main scan sectional plane (a main scan sectional plane diagram)

FIG. 1 is a cross-sectional view showing a major portion of a scanning optical system of a first embodiment of the present invention, taken in a main scan sectional plane (a main scan sectional plane diagram).

A light source 1 is a semiconductor laser.

A collimator lens 2 converts, into convergent light beam, divergent light beam emitted from the light source 1 through an aperture diaphragm 3 to be discussed later.

The aperture diaphragm 3 regulates the light beam from the collimator lens 2 into a light beam having an optimum beam shape.

A cylindrical lens 4, having a predetermined refractive power in the sub scan direction only, focuses the light beam from the collimator lens 2 in the vicinity of a deflection surface 5a of a deflector 5 to be discussed later, in a sub scan sectional plane (in an elongated line image in a main scan sectional plane).

An input optical system is composed of the collimator lens 2, the aperture diaphragm 3, and the cylindrical lens 4.

The deflector 5 includes a polygon mirror, and is rotated at a constant speed in the direction represented by an arrow A by a drive mechanism (not shown) such as a motor.

A scanning optical unit 6 includes an fθ lens system of 6a and 6b having fθ characteristics.

The scanning optical unit 6 sets the deflection surface 5a to be optically conjugate with a scanning surface 7, thereby having a function of correcting a tilt.

The divergent light beams emitted from the light source 1 in this embodiment are regulated into a beam having a predetermined beam shape through the aperture diaphragm 3. The beam is then converted into a convergent light beam through the collimator lens 2. The cylindrical lens 4 focuses the light beam in the vicinity of the deflection surface 5a of the deflector 5 in the sub scan direction (in an elongated line image in the main scan sectional plane). The light beam, reflected and deflected by the deflection surface 5a, is then focused into a spot on the scanning surface 7 (the surface of a photosensitive drum). By rotating the deflector 5 in the direction represented by the arrow A, the light beam scans the photosensitive drum 7 in a direction represented by an arrow B at a constant speed.

Aspheric surfaces of a first optical element 6a and a second optical element 6b, forming the scanning optical unit 6 in the first embodiment, are expressed as below. Here, the origin is set to be at the intersection of the optical surface of each element and the optical axis (which is an axis passing through the vertex of the optical element and is perpendicular to the optical surface), the X axis is aligned with the optical axis, the Y axis lies in the main scan sectional plane and is perpendicular to the optical axis, and the Z axis is perpendicular to each of the X axis and the Y axis.

The aspherical surface in the main scan sectional plane is expressed by the following equation.

$$X = (Y^2/R)/(1+\sqrt{1-(1+k)(Y/R)^2}) + \Sigma B_{2i} Y^{2i}$$

where R is a curvature radius in the main scan sectional plane with Y=0, and k and $B_{2i}$ (i=2, 3, 4, . . . ) are aspherical coefficients (coefficients identified by the letter l and coefficients identified by the letter u are to the scanning surface side).

A spherical surface having the radius of curvature in the sub scan sectional plane (a section perpendicular to a generatrix) that continuously varies in the Y axis direction is expressed by the following equation.

$$r' = r(1 + \Sigma D_{2i} Y^{2i})$$

where r is a radius of curvature in the sub scan sectional plane with Y=0, $D_{2i}$ are coefficients (i=1, 2, 3, . . . ) (coefficients identified by the letter l are the scanning start side and coefficients identified by the letter u are the scanning end side). The generatrix is a curvature where the main scan section plane and the optical surface meet.

The optical arrangement in the first embodiment is listed in Table 1, and aspherical coefficients of each optical element are listed in Table 2.

TABLE 1

|  | R | D | N |
|---|---|---|---|
| Light source | — | 24.669 | — |
| Diaphragm | ∞ | 0.500 | — |
| Collimator lens R1 surface | ∞ | 2.000 | 1.76203 |
| Collimator lens R2 surface | −18.866 | 29.510 | — |
| Cylinder R1 surface | 24.633 | 6.000 | 1.51072 |
| Cylinder R2 surface | ∞ | 39.547 | — |
| Deflection surface | ∞ | 36.525 | — |
| G1R1 | — | 5.000 | 1.5242 |
| G1R2 | — | 2.500 | — |
| G2R1 | — | 8.000 | 1.5242 |
| G2R2 | — | 121.926 | — |

TABLE 2

|  | G1R1 | | G1R2 | | G2R1 | | G2R2 | |
|---|---|---|---|---|---|---|---|---|
|  | u | l | u | l | u | l | u | l |
| Main Scanning | | | | | | | | |
| R | −320.6715 | −320.6715 | −153.304 | −153.304 | 65.379 | 65.379 | 89.4428 | 89.4428 |
| k | 22.48583 | 22.48583 | −3.815984 | −3.815984 | −5.77866 | −5.65186 | −6.34725 | −6.34725 |
| B4 | 2.7586E − 07 | 2.7586E − 07 | 5.8467E − 08 | −5.8467E − 08 | −2.2972E − 06 | −2.1510E − 06 | −2.8207E − 06 | −2.8207E − 06 |
| B6 | 1.5269E − 10 | 1.5269E − 10 | 1.4478E − 10 | 1.4478E − 10 | 4.0231E − 10 | 2.2067E − 10 | 5.8452E − 10 | 5.8452E − 10 |
| B8 | −1.0152E − 13 | −1.0152E − 13 | −3.1040E − 14 | −3.1040E − 14 | −4.7490E − 14 | 4.1966E − 14 | −1.5860E − 13 | −1.5860E − 13 |
| B10 | −7.3141E − 17 | −7.3141E − 17 | −7.8484E − 17 | −7.8484E − 17 | 1.2463E − 17 | −3.8352E − 18 | 2.8141E − 17 | 2.8141E − 17 |

TABLE 2-continued

| | G1R1 | | G1R2 | | G2R1 | | G2R2 | |
|---|---|---|---|---|---|---|---|---|
| | u | l | u | l | u | l | u | l |
| Sub Scanning | | | | | | | | |
| r | −320.6715 | −320. 6715 | −153.3041 | −153.3041 | −21.2194 | −21.2194 | −11.5536 | −11.5536 |
| D2 | 8.8653E − 05 | 8.8653E − 05 | 5.9211E − 05 | 5.9211E − 05 | 1.4622E − 03 | 1.5301E − 03 | 7.1593E − 04 | 7.1593E − 04 |
| D4 | −2.0350E − 08 | −2.0350E − 08 | −3.6837E − 09 | −3.6837E − 09 | −5.8127E − 07 | −7.9973E − 07 | −5.3663E − 07 | −5.3663E − 07 |
| D6 | 7.5289E − 12 | 7.5289E − 12 | 9.5231E − 12 | 9.5231E − 12 | −3.5152E − 11 | 8.2573E − 11 | 1.6827E − 10 | 1.6827E − 10 |
| D8 | −3.8540E − 14 | −3.8540E − 14 | −1.0151E − 14 | −1.0151E − 14 | −4.8775E − 14 | −4.0529E − 15 | −1.6950E − 14 | −1.6950E − 14 |
| D10 | 9.7155E − 18 | 9.7155E − 18 | 6.7100E − 18 | 6.7100E − 18 | 1.9902E − 17 | −1.4866E − 17 | −6.2056E − 18 | −6.2056E − 18 |

Referring to Table 1 through Table 4, R represents a radius of curvature (in the cylindrical lens 4, R represents a radius of curvature in the sub scan sectional plane and the radius of curvature in the main scan sectional plane is a flat surface), R1 represents a light incident surface of each optical element, R2 represents a light exit surface of each optical element, G1 represents the first optical element 6a (lens), and G2 represents the second optical element 6b, D is an element-to-element distance, and N is a refractive index.

Figure 4:
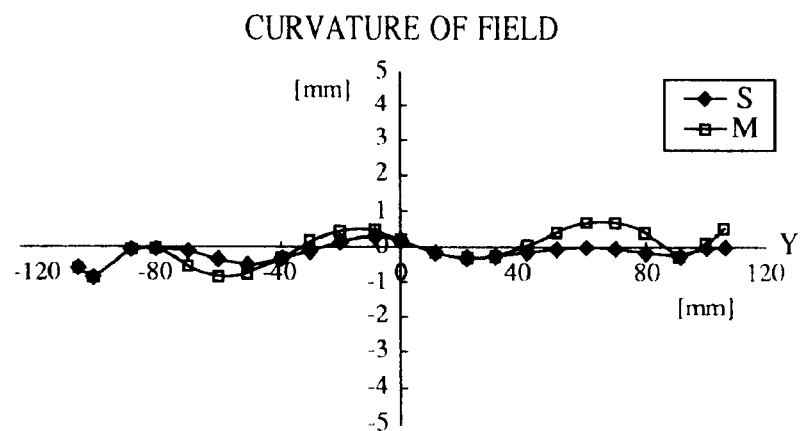
FIG. 4 shows a curvature of field of the first embodiment.
Figure 5:
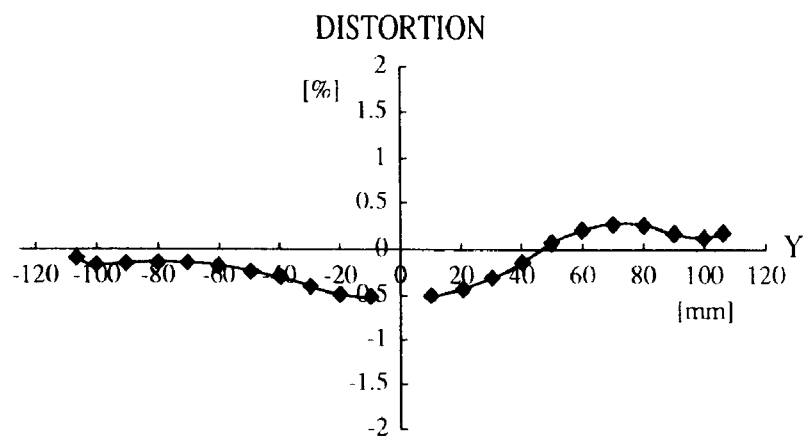
FIG. 5 shows a distortion of the first embodiment.
Figure 6A:
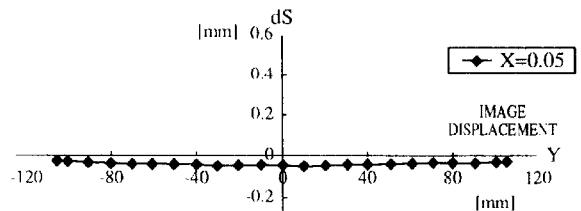
FIGS. 6A–6F show a displacement of a sub scan image in the first embodiment.
Figure 6B:
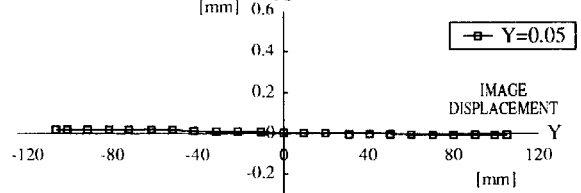
Figure 6C:
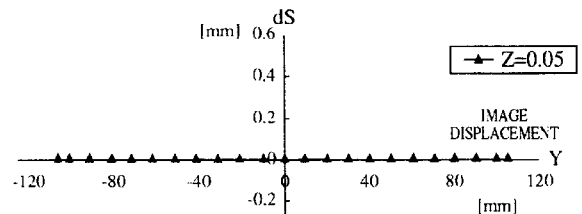
Figure 6D:
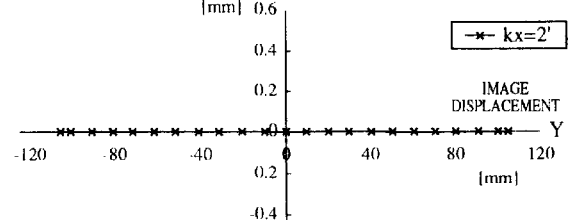
Figure 6E:
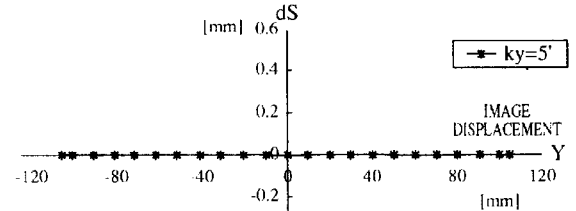
Figure 6F:
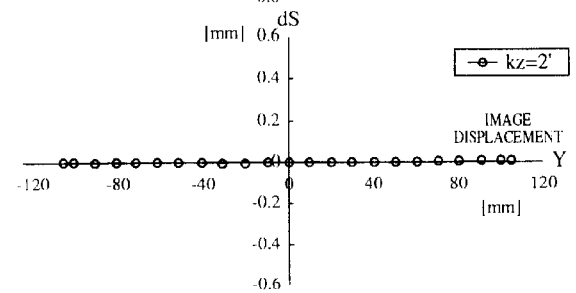
Figure 7A:
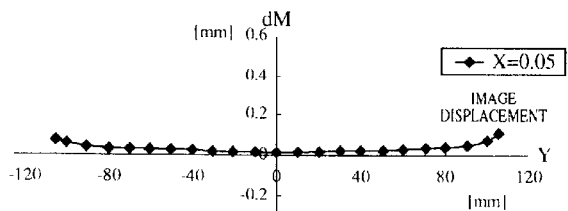
FIGS. 7A–7F show a displacement of a main scan image in the first embodiment.
Figure 7B:
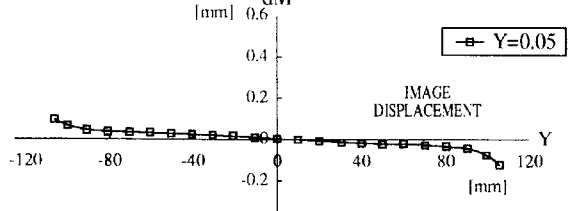
Figure 7C:
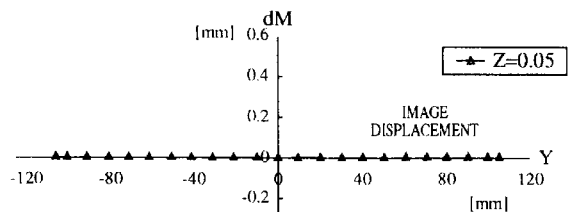
Figure 7D:
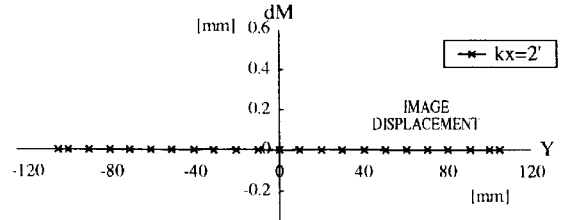
Figure 7E:
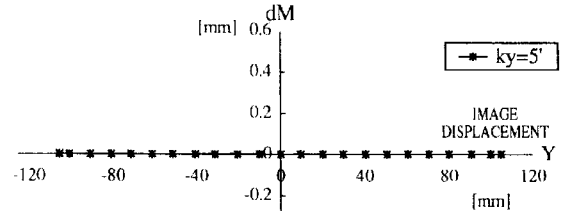
Figure 7F:
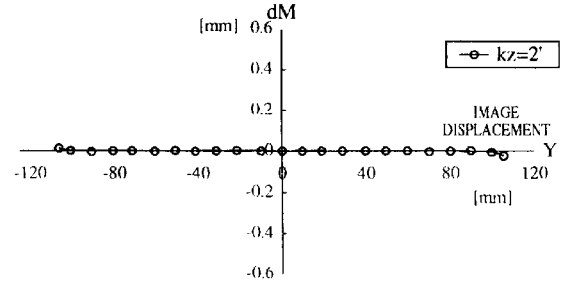
Figure 8A:
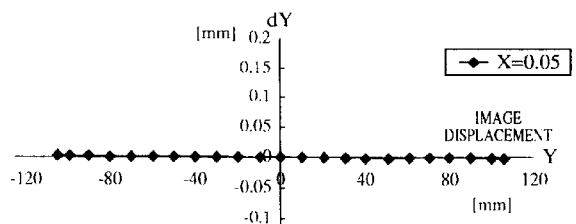
FIGS. 8A–8F show a displacement of a focused point in the Y direction in the first embodiment.
Figure 8B:
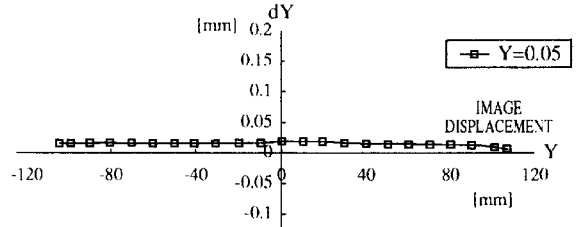
Figure 8C:
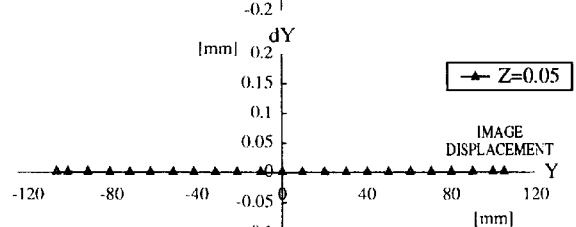
Figure 8D:
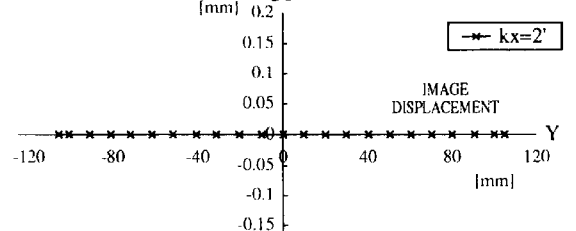
Figure 8E:
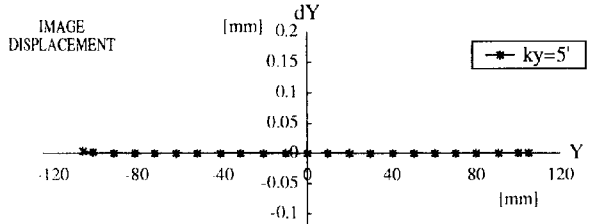
Figure 8F:
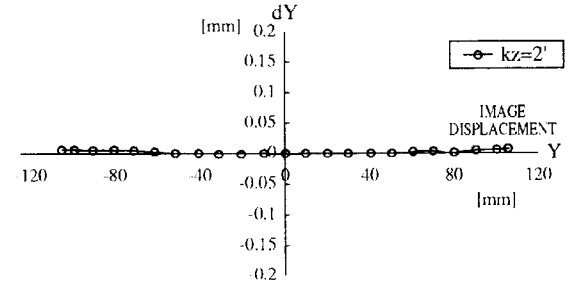

In the first embodiment, both surfaces of first optical element 6a of the scanning optical unit 6 facing the deflector 5 and the scanning surface 7 are optically anamorphically aspherical. Optical performance of the first embodiment is shown in FIG. 4 and FIG. 5. FIG. 4 shows curvatures of field of the main scan (represented by the letter M) and of the sub scan (represented by the letter S), and FIG. 5 shows distortion of the first embodiment.

Figure 2:
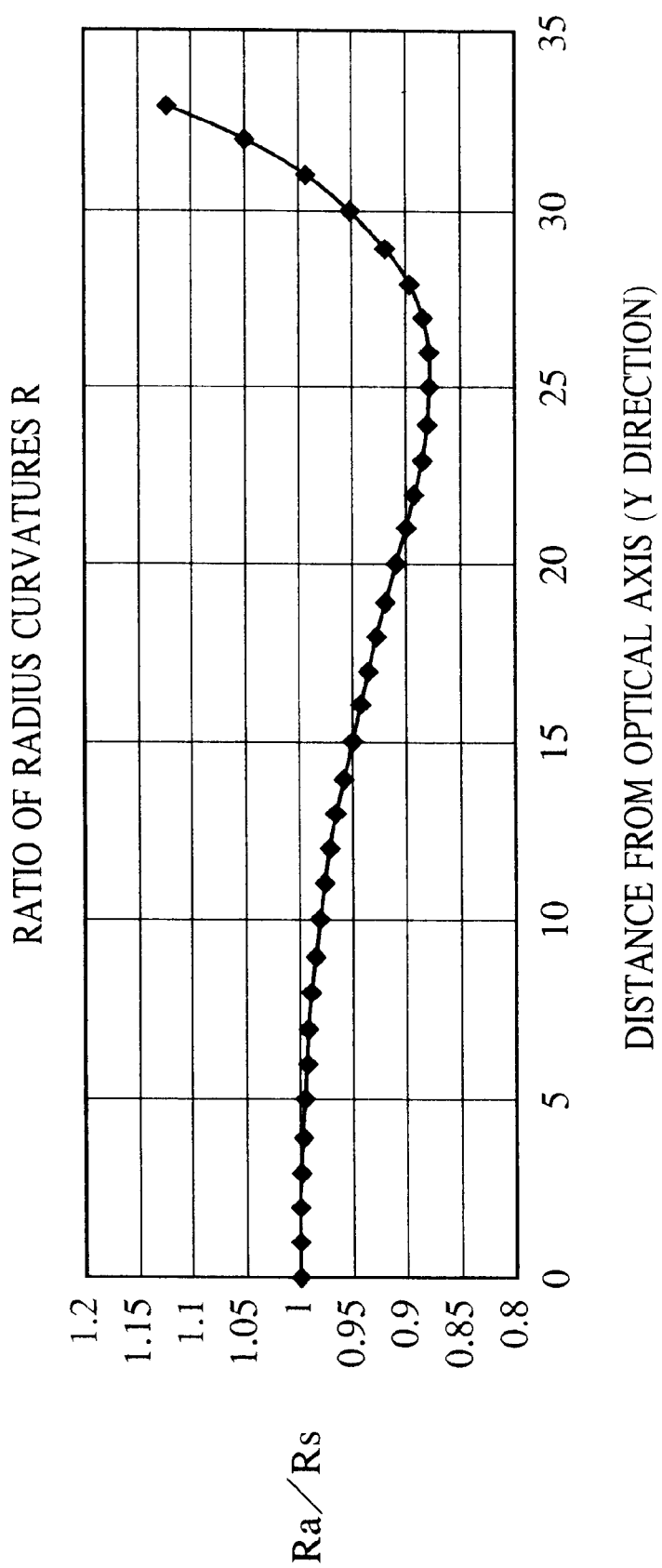
FIG. 2 is a chart showing the ratio of Ra and Rs of a lens 6a of the first embodiment on the side thereof facing a deflector in the main scan direction.
Figure 3:
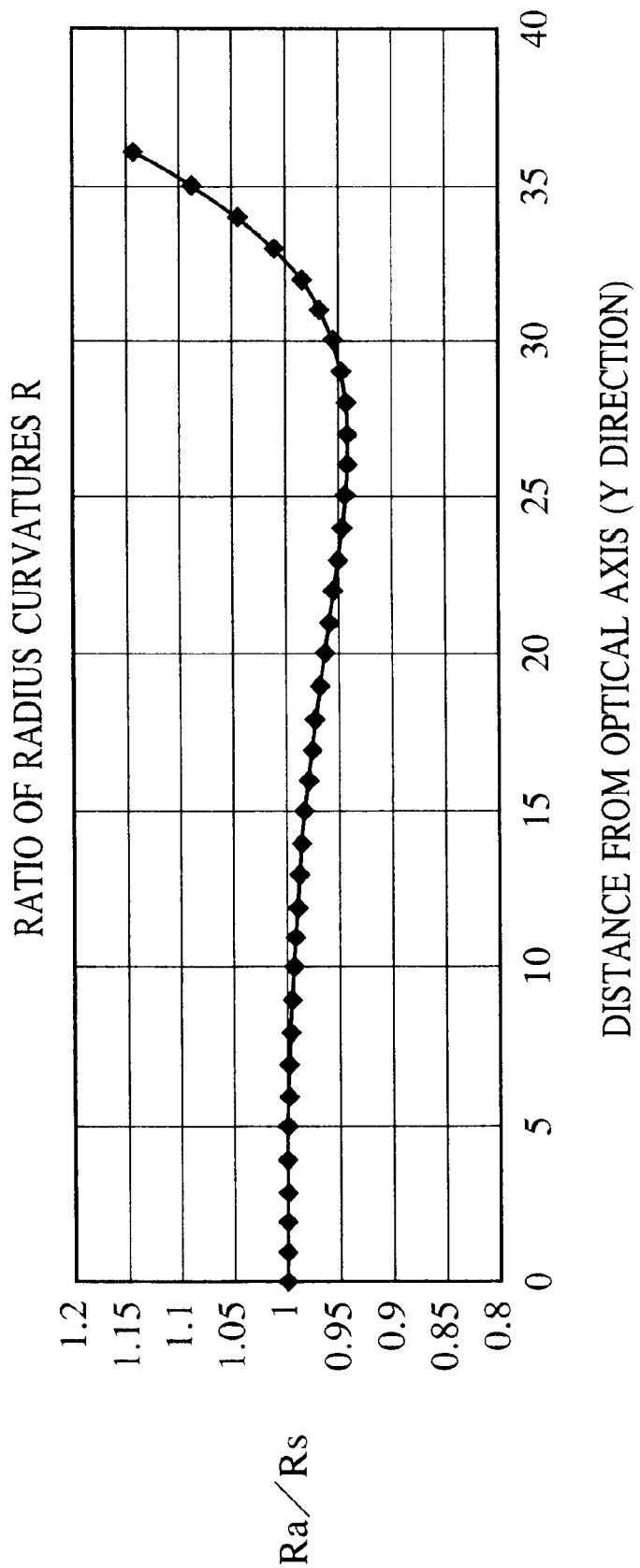
FIG. 3 is a chart showing the ratio of Ra and Rs of a lens 6a of the first embodiment on the side thereof facing a scanning surface in the main scan direction.
Figure 9A:
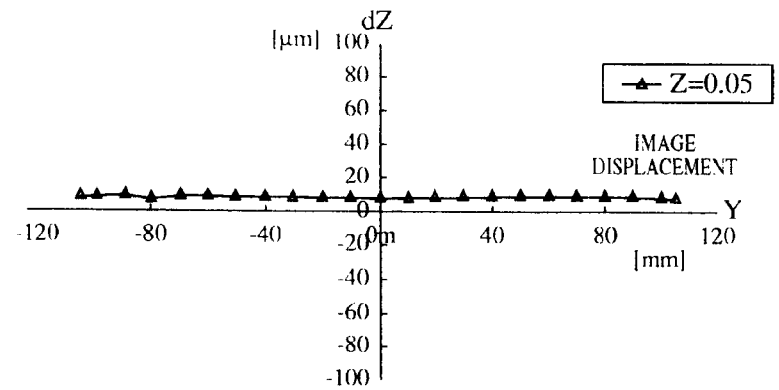
FIGS. 9A–9C show a displacement of a focused point in the Z direction in the first embodiment.
Figure 9B:
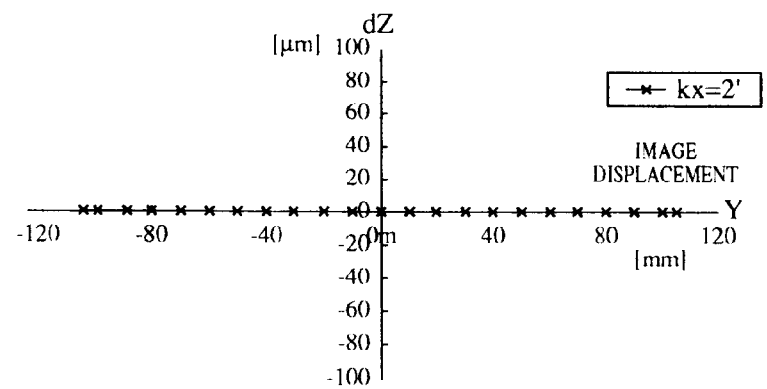
Figure 9C:
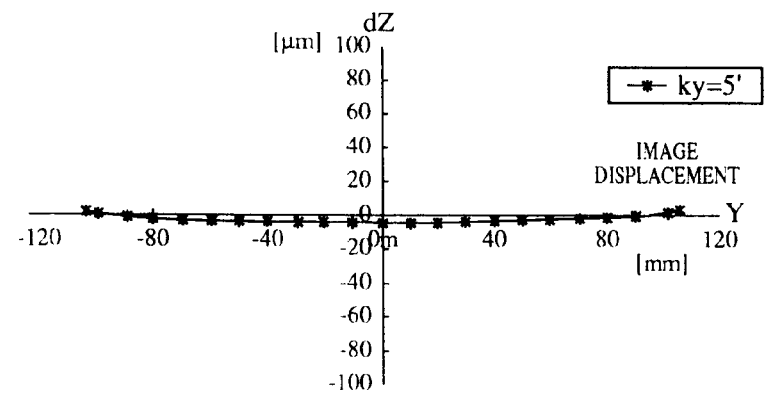

FIG. 2 (the G1R1 surface) and FIG. 3 (the G1R2 surface) plot the ratio of Ra (r' expressed the above equation) and Rs (the radius of curvature of a rotationally symmetrical aspherical surface in the sub scan sectional plane which results when the main scan sectional plane defined by the above equation is rotated about the optical axis). The ratio of Ra to Rs in FIG. 2 (the G1R1 surface) and in FIG. 3 (the G1R2 surface) falls within a range from 0.8 to 1.2, and is approximately 1.0 in the vicinity of the optical axis. The effective area of the first optical element 6a facing the deflector 5 is ±34 mm, and the effective area of the first optical element 6a facing the scanning surface 7 is ±36 mm. The surfaces of the first optical element 6a, shaped in these configurations, present sufficient performance (see FIG. 4 and FIG. 5). Fabricating the optical elements of a resin reduces costs while facilitating the correction of the die which is essentially required in the molding process. The scanning optical system free from the effect of decentered optical elements is thus provided as shown in FIG. 6A through FIG. 9C. FIGS. 6A–6F show an image displacement on a sub scan image plane. FIGS. 7A–7F show an image displacement on a main scan image plane. FIGS. 8A–8F show a displacement of a focused point in the Y direction. FIGS. 9A–9C show a displacement of a focused point in the Z direction. As shown, X represents a decenter in the X axis direction (a decenter of 0.05 mm), Y represents a decenter in the Y axis direction (a decenter of 0.05 mm), Z represents a decenter in the Z axis direction (a decenter of 0.05 mm), kx represents a rotation about the X axis (a rotation of 2 minutes), ky represents a rotation of about the Y axis (a rotation of 5 minutes), and kz represents a rotation about the Z axis (a rotation of 2 minutes). FIGS. 9A–9C show three types of decenters, because there is no effect even if other types of decentering take place.

The Rs (the radius of curvature in the sub scan direction on a rotationally symmetrical surface) is as follows:

G1R1 surface: $-381.1 \leq Rs \leq -297.1$

G1R2 surface: $-170.8 \leq Rs \leq -146.1$

Now considered is a rotationally symmetrical aspherical surface that is obtained by rotating a rotationally asymmetrical generatrix of an anamorphically aspherical surface in the first embodiment. The ratio of the maximum value and the minimum value of the absolute radius of curvature Rs in the sub scan sectional plane preferably satisfies the following conditions:

$$1.1 \leq \max|Rs|/\min|Rs| \leq 3.0$$

Even if a lens having a greatly varied shape (the ratio exceeding 3.0 in the above equation) is configured in a nearly rotationally symmetrical aspherical surface, it is difficult to control the effect of decentering. Conversely, a lens having almost no varied shape (the ratio is below 1.1 in the above equation) contributes less to performance improvements, and there are times when required performance is not achieved.

The radius of curvature Rs in the sub scan sectional plane of a rotationally symmetrical aspherical surface that is obtained by rotating a rotationally asymmetrical generatrix of an anamorphically aspherical surface is preferably within the following range:

$$-500 \leq Rs \leq -30$$

More preferably, the radius of curvature Rs falls within the following range:

$$-400 \leq Rs \leq -60$$

If the radius of curvature Rs falls out of the above range, reducing the effect of decentering while improving performance at the same time is difficult.

If the scanning optical unit 6 fails to satisfy the above described surface conditions, the following problems arise. For example, 1) when the surfaces in the main scan section and the sub scan section fail to satisfy the condition of 0.8<Ra/Rs<1.2, the scanning optical system is subject to the effect of decentering, and 2) when the rotationally symmetrical aspherical surface is incorporated, a smaller number of lens elements is unable to attain a sufficient optical performance, and the correction of the die becomes difficult. The radius of curvature in the sub scan sectional plane and the main scan radius of curvature are substantially equal to each other in the vicinity of the origin. With this arrangement, the radius of curvature in the sub scan sectional plane, which is difficult to control particularly in the peripheral area of the effective scanning range, satisfies the condition of 0.8<Ra/Rs<1.2 throughout the effective scanning range. A mirror is not preferable as an optical element, because the surface accuracy of the mirror must be twice as strict as that of a lens. Glass is not preferable as a material for the optical element. If the optical element is manufactured of glass rather than a resin, a complex shape cannot be incorporated into the optical element in the cutting process thereof. The glass lens cannot attain desired optical performance and results in a cost increase.

The first embodiment employs two lens elements in the scanning optical unit to result in optical performance better than that attained by a single lens element. The lens 6a has an anamorphically aspherical surface facing the deflector because of the following reasons. 1) Since the lens 6a is smaller in radius than the lens 6b in the main scan direction, the lens 6a is more subject to occurrences of decentering about the optical axis. 2) Since the distance of the lens 6a to the scanning surface is longer, the effect of decentering tends to be more pronounced. 3) Since refractive power of the anamorphically aspherical surface in the sub scan direction is approximately equal to refractive power thereof in the main scan direction, refractive power in the sub scan direction cannot be increased too much. If the lens 6b facing the scanning surface has an anamorphically aspherical surface, the lens facing the defector has a larger refractive power in the sub scan direction. As a result, sub scan magnification becomes too high, thereby leading to a degradation in print quality in response to even a slight degree of decentering. The anamorphically aspherical surface is preferably incorporated in a surface of the scanning optical unit facing the deflector. The above reasons 2) and 3) when a plurality of lens elements are employed are also applied. Specifically, a) since the distance of the surface of the lens facing the scanning surface is longer to the scanning surface, the effect of decentering tends to be more pronounced; and b) since refractive power of the anamorphically aspherical surface in the sub scan direction is approximately equal to refractive power thereof in the main scan direction, refractive power in the sub scan direction cannot be increased too much. If the surface facing the scanning surface has an anamorphically aspherical surface, the surface facing the defector has a larger refractive power in the sub scan direction. As a result, sub scan magnification becomes too high, thereby leading to a degradation in print quality in response to a slight degree of decentering.

In the first embodiment, the optical axis of a light beam transmitted through an optical element having an anamorphically aspherical surface is offset upward by 0.20 mm on the scanning surface with respect to a light beam that may be deflected from the deflector and incident on the scanning surface if no scanning optical unit is employed. This is because the manner in which the curvature of field takes place is different on the right hand side and on the left hand side on the deflection surface, because the rotary polygon mirror having no rotary axis on the deflection surface is used as deflection means. To reduce the offset, the optical element is decentered. The same effect is provided if the optical surface only is decentered.

Figure 10:
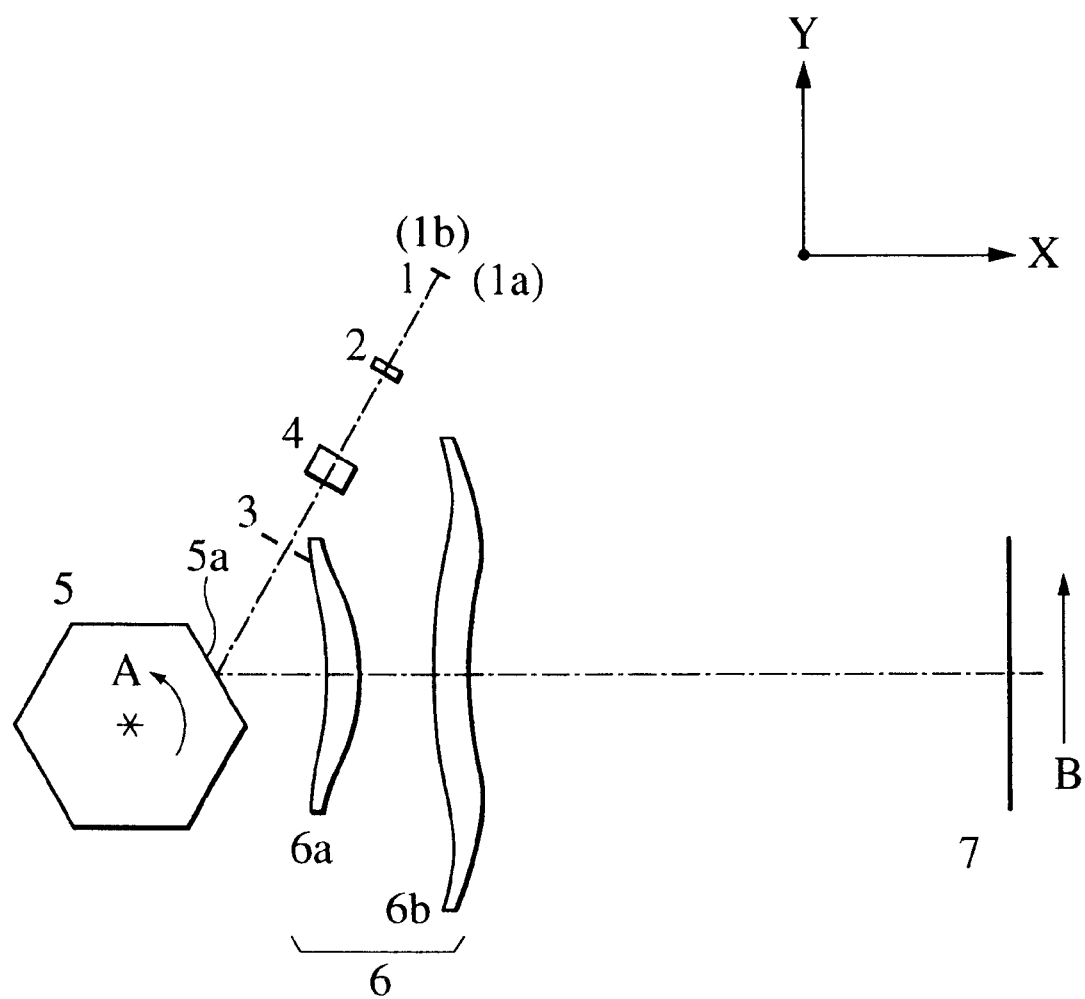
FIG. 10 is a cross-sectional view of showing a major portion of a scanning optical system of a second embodiment and a third embodiment of the present invention, taken in a main scan sectional plane (a main scan sectional plane diagram)

FIG. 10 shows a major portion in the main scan direction (a main scan sectional view) showing second and third embodiments of the present invention. Table 3 lists an optical layout of the second and third embodiments, and Table 4 lists aspherical coefficients of each surface.

TABLE 3

|  | R | D | N |
|---|---|---|---|
| Light source | — | 23.585 | — |
| Collimator lens R1 surface | 182.212 | 2.000 | 1.76203 |
| Collimator lens R2 surface | −20.8308 | 22.260 | — |
| Cylinder R1 surface | 26.993 | 6.000 | 1.51072 |
| Cylinder R2 surface | ∞ | 16.430 | — |
| Diaphragm | ∞ | 31.950 | — |
| Deflection surface | ∞ | 24.500 | — |
| G1R1 | — | 8.000 | 1.5242 |
| G1R2 | — | 15.369 | — |
| G2R1 | — | 7.000 | 1.5242 |
| G2R2 | — | 119.081 | — |

TABLE 4

| | G1R1 | | G1R2 | | G2R1 | | G2R2 | |
|---|---|---|---|---|---|---|---|---|
| | u | l | u | l | u | l | u | l |
| Main Scanning | | | | | | | | |
| R | −62.04392 | −62.04392 | −35.19858 | −35.19858 | 88.19567 | 88.19567 | 86.69997 | 86.69997 |
| k | −4.61089 | −4.61089 | −2.12978 | −2.12978 | −0.532797 | −0.532797 | −16.9591 | −16.9591 |
| B4 | 2.8520E − 06 | 2.8520E − 06 | −4.4818E − 07 | −4.4818E − 07 | −4.5268E − 06 | −4.5268E − 06 | −3.2165E − 06 | −3.2165E − 06 |
| B6 | 0.0000E + 00 | 0.0000E + 00 | 2.0614E − 09 | 2.0614E − 09 | 2.2802E − 09 | 2.2802E − 09 | 1.39488E − 09 | 1.3949E − 09 |
| B8 | 0.0000E + 00 | 0.0000E + 00 | −2.3640E − 14 | −2.3640E − 14 | −7.4582E − 13 | −7.4582E − 13 | −3.7612E − 13 | −3.7612E − 13 |
| B10 | 0.0000E + 00 | 0.0000E + 00 | 0.0000E + 00 | 0.0000E + 00 | 8.4243E − 17 | 8.4243E − 17 | 2.16568E − 17 | 2.1657E − 17 |
| Sub Scanning | | | | | | | | |
| r | −62.04392 | −62.04392 | −59.1771 | −59.1771 | −37.27268 | −37.27268 | −13.92793 | −13.92793 |
| D2 | 1.0518E − 03 | 1.0518E − 03 | −6.2375E − 05 | −3.5269E − 04 | 3.6088E − 03 | 3.6088E − 03 | 1.2622E − 03 | 1.2622E − 03 |
| D4 | 3.6102E − 06 | 3.6102E − 06 | −1.9803E − 06 | −5.6487E − 07 | 3.9749E − 06 | 3.9749E − 06 | −1.1175E − 06 | −1.1175E − 06 |
| D6 | −4.1974E − 09 | −4.1974E − 09 | 2.9611E − 09 | 1.9080E − 09 | 6.1792E − 11 | 6.1792E − 11 | 6.8161E − 10 | 6.8161E − 10 |
| D8 | −7.3280E − 12 | −7.3280E − 12 | 0.0000E + 00 | 0.0000E + 00 | −5.2254E − 13 | −5.2254E − 13 | −2.4477E − 13 | −2.4477E − 13 |
| D10 | 2.2743E − 14 | 2.2743E − 14 | 0.0000E + 00 | 0.0000E + 00 | 0.0000E + 00u | 0.0000E + 00 | 3.6493E − 17u | 3.6493E − 17 |

The second embodiment incorporates one light source only, while the third embodiment incorporates a plurality of light source element (two light source elements here). The second and third embodiments are identical in the rest of the construction thereof.

Second Embodiment

The second embodiment will now be discussed in detail.

In FIG. 10, components identical to those described with reference to FIG. 1 are designated with the same reference numerals and the discussion thereof is skipped here.

In the second embodiment, the surface of the first optical element 6a of the scanning optical unit 6 facing the deflector 5 is an anamorphically aspherical surface which is less subject to the effect of decentering.

Figure 12:
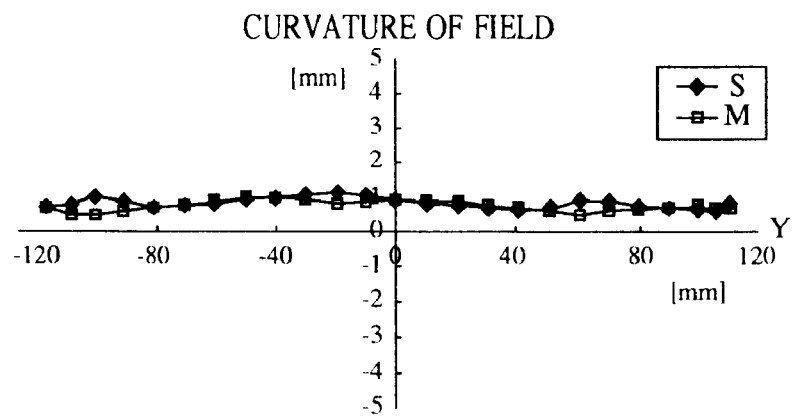
FIG. 12 shows a curvature of field of the second embodiment and the third embodiment.
Figure 13:
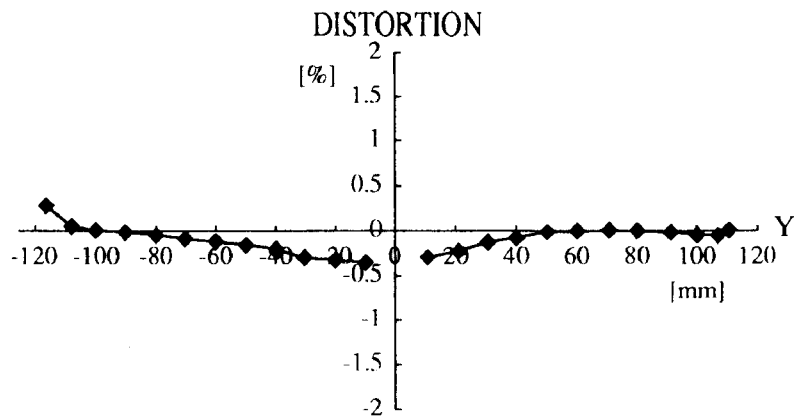
FIG. 13 shows a distortion of the second embodiment and the third embodiment.
Figure 14A:
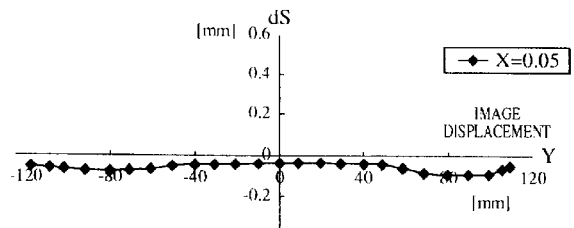
FIGS. 14A–14F show a displacement of a sub scan image in the second embodiment and the third embodiment.
Figure 14B:
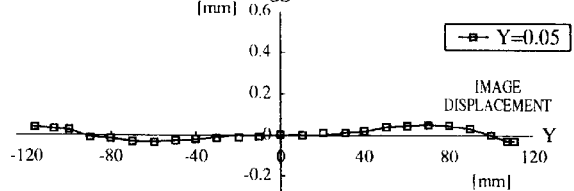
Figure 14C:
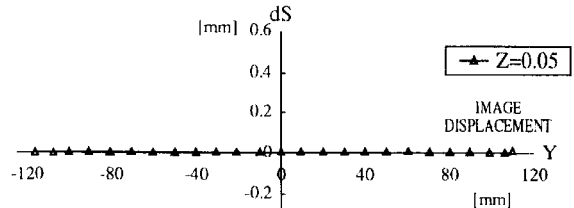
Figure 14D:
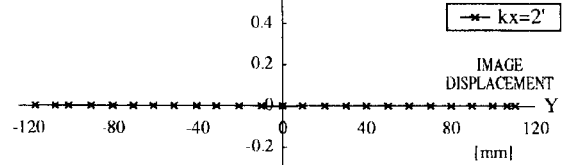
Figure 14E:
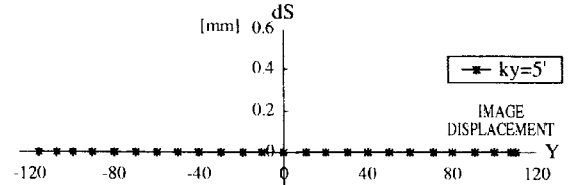
Figure 14F:
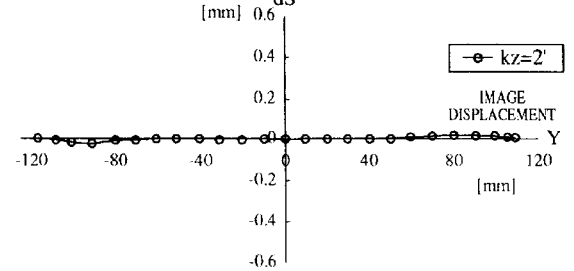
Figure 15A:
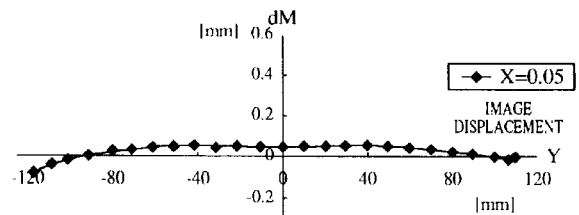
FIGS. 15A–15F show a displacement of a main scan image in the second embodiment and the third embodiment.
Figure 15B:
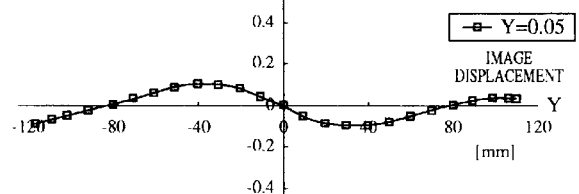
Figure 15C:
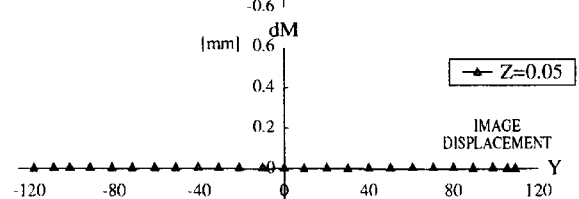
Figure 15D:
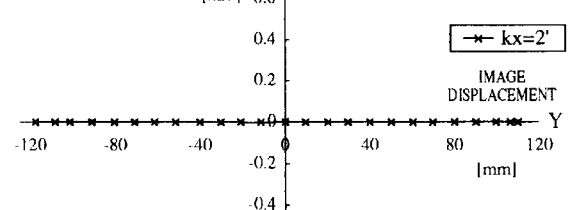
Figure 15E:
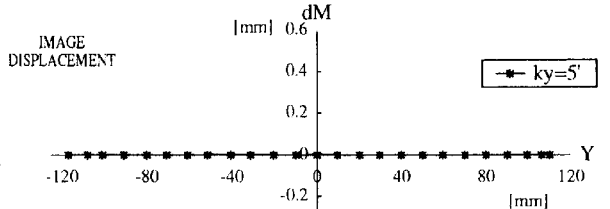
Figure 15F:
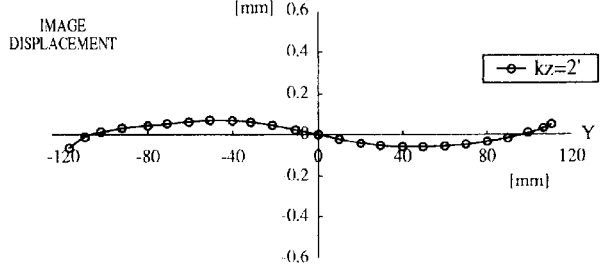
Figure 16A:
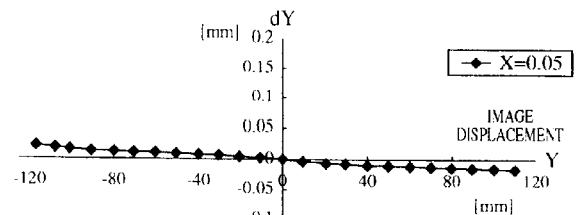
FIGS. 16A–16F show a displacement of a focused point in the Y direction in the second embodiment and the third embodiment.
Figure 16B:
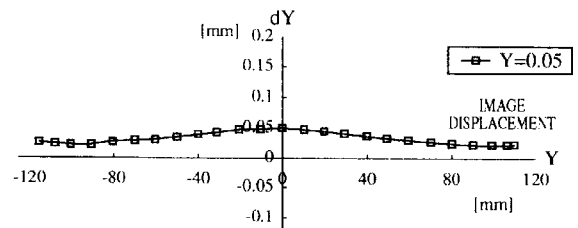
Figure 16C:
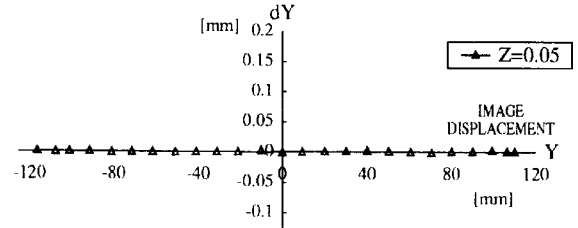
Figure 16D:
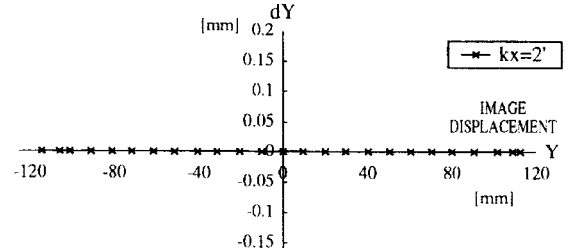
Figure 16E:
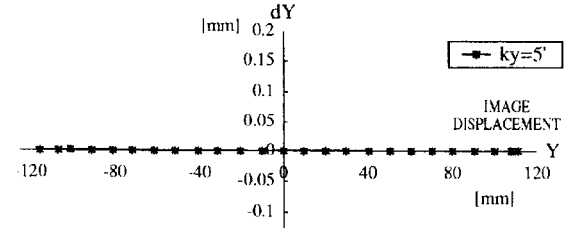
Figure 16F:
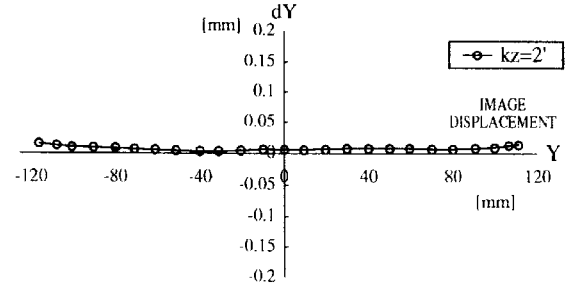

Optical performance of the second embodiment is shown in FIG. 12 and FIG. 13.

FIG. 12 shows a curvature of field in the main scan (represented by the letter M) and a curvature of field in the sub scan (represented by the letter S), and FIG. 13 shows distortion of the second embodiment.

Figure 11:
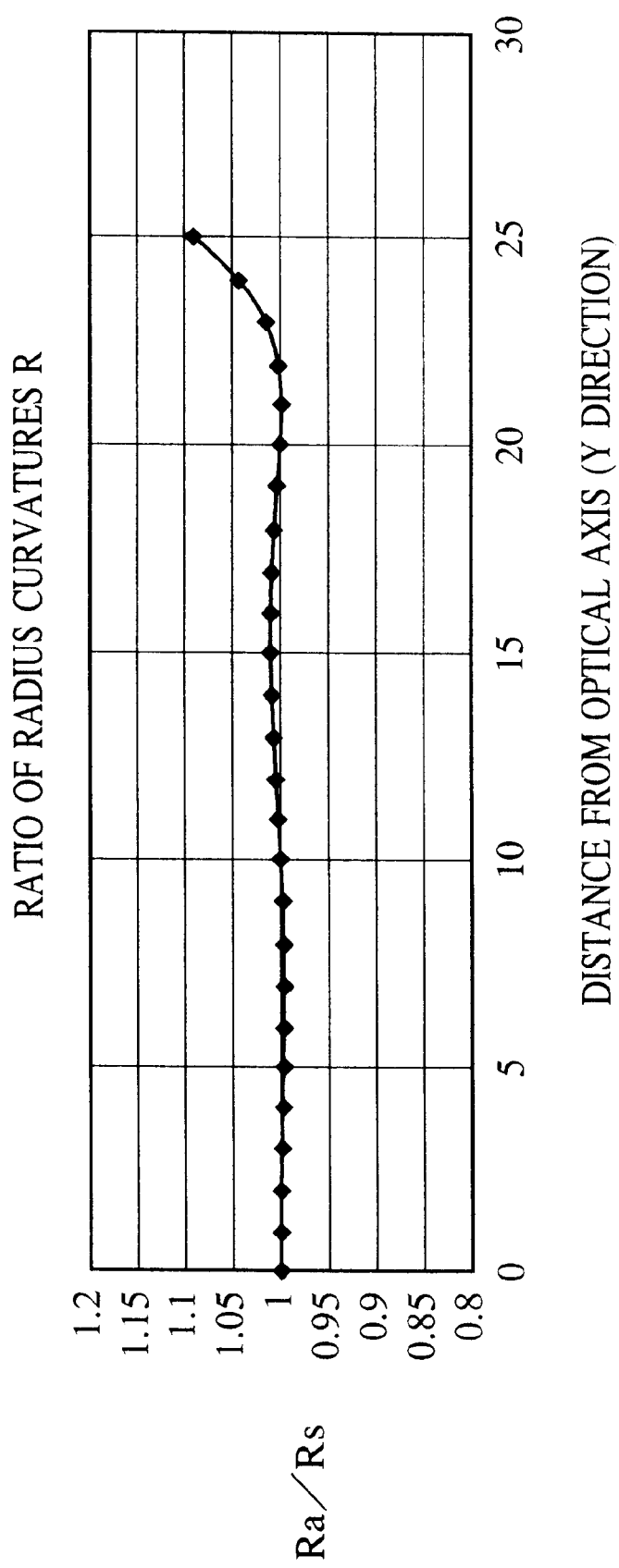
FIG. 11 is a chart showing the ratio of Ra and Rs of a lens 6a of the second embodiment and the third embodiment on the side thereof facing a deflector in the main scan direction.

For the same reasons discussed in connection with the first embodiment, the shapes expressed by the functions of the main scan section and the sub scan section defined in the first embodiment are applied to the optical surfaces of the scanning optical unit 6 in the second embodiment. The radius of curvature in the sub scan sectional plane of the optical surface of the lens 6a facing the deflector 5 is designed so that the ratio of Ra to Rs falls within a range from 0.8 to 1.2 over the entire effective scanning range as shown in FIG. 11 (the G1R1 surface). Sufficient performance is assured with design values (as shown in FIG. 12 and FIG. 13). The effect of decentering is thus reduced. The effective area of the optical surface is ±25 mm.

Figure 17A:
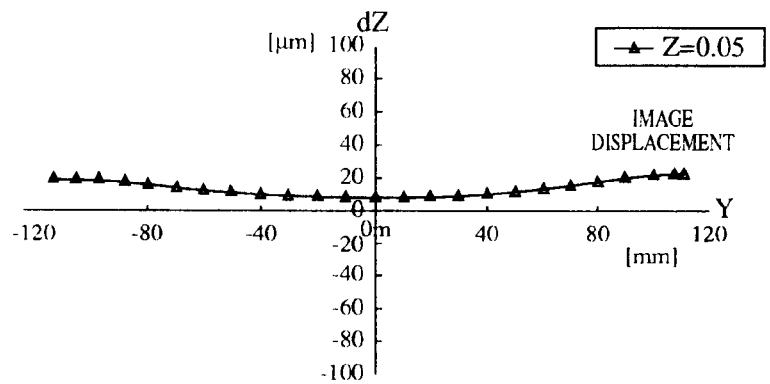
FIGS. 17A–17C show a displacement of a focused point in the Z direction in the second embodiment and the third embodiment.
Figure 17B:
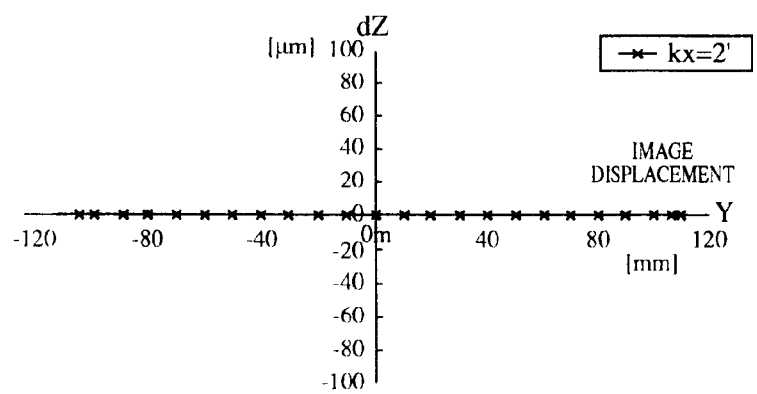
Figure 17C:
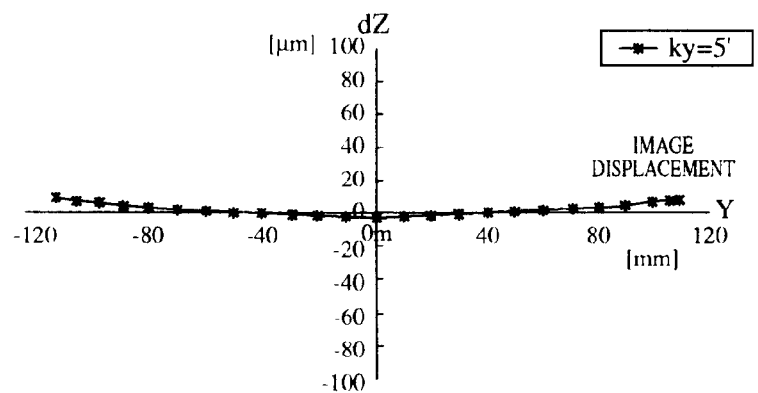

FIG. 14A through FIG. 17C show the effect of decentering. FIGS. 14A–14F show an image displacement in a sub scan image plane. FIGS. 15A–15F show an image displacement in a main scan image plane. FIGS. 16A–16F show a displacement of a focused point in the Y direction. FIGS. 17A–17C show a displacement of a focused point in the Z direction. As shown, X represents a decenter in the X axis direction (a decenter of 0.05 mm), Y represents a decenter in the Y axis direction (a decenter of 0.05 mm), Z represents a decenter in the Z axis direction (a decenter of 0.05 mm), kx represents a rotation about the X axis (a rotation of 2 minutes), ky represents a rotation of about the Y axis (a rotation of 5 minutes), and kz represents a rotation about the Z axis (a rotation of 2 minutes). FIGS. 17A–17C show three types of decenters, because there is no effect even if other types of decentering take place.

The Rs (the radius of curvature in the sub scan direction on a rotationally symmetrical surface) is as follows:

G1R2 surface: $-176.5 \leq Rs \leq -62.04$

Now considered is a rotationally symmetrical aspherical surface that is obtained by rotating a rotationally asymmetrical generatrix of an anamorphically aspherical surface in the second embodiment. The ratio of the maximum value and the minimum value of the absolute radius of curvature Rs in the sub scan sectional plane preferably satisfies the following conditions:

$1.1 \leq \max|Rs|/\min|Rs| \leq 3.0$

Even if a lens having a greatly varied shape (the ratio exceeding 3.0 in the above equation) is configured in a nearly rotationally symmetrical aspherical surface, it is difficult to control the effect of decentering. Conversely, a lens having almost no varied shape (the ratio is below 1.1 in the above equation) contributes less to performance improvements, and there are times when required performance is not achieved.

The radius of curvature Rs in the sub scan sectional plane of a rotationally symmetrical aspherical surface that is obtained by rotating a rotationally asymmetrical generatrix of an anamorphically aspherical surface is preferably within the following range:

$-500 \leq Rs \leq -30$

More preferably, the radius of curvature Rs falls within the following range:

$-400 \leq Rs \leq -60$

If the radius of curvature Rs falls out of the above range, reducing the effect of decentering while improving performance at the same time is difficult.

In the second embodiment, the optical axis of a light beam transmitted through an optical element having an anamorphically aspherical surface is offset upward by 0.33 mm on the scanning surface with respect to a light beam that may be deflected from the deflector and incident on the scanning surface if no scanning optical unit is employed. This is because the manner in which the curvature of field takes place is different on the right hand side and on the left hand side on the deflection surface, because the rotary polygon mirror having no rotary axis on the deflection surface is used as deflection means. To reduce the offset, the optical element is decentered. The same effect is provided if the optical surface only is decentered.

Third Embodiment

A third embodiment will now be discussed in detail.

Referring to FIG. 10, there are shown light source elements 1a and 1b respectively formed semiconductor lasers. In the third embodiment, the light source element 1a is spaced apart from the light source element 1b by 90 μm. With the light sources spaced apart by this distance in the sub scan direction, the focused points are far apart on the scanning surface 7 to be discussed later. By rotating the light source elements about the optical axis, the focused points of the light source elements are spaced apart by about 21 μm in the sub scan direction.

A collimator lens 2 converts divergent light rays emitted from the light source elements 1a and 1b into a parallel light beam.

In the third embodiment, the surface of the first optical element 6a of the scanning optical unit 6 facing the deflector 5 is an anamorphically aspherical surface which is less subject to the effect of decentering.

Optical performance of the third embodiment remains unchanged from that of the second embodiment, and the curvature of field and distortion are not discussed further.

For the same reason, performance during decentering is identical to that of the second embodiment, and the discussion thereof is skipped here.

Figure 18:
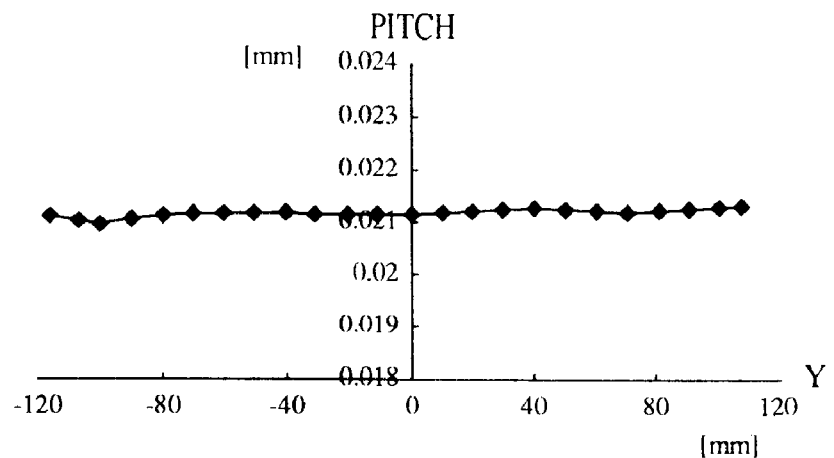
FIG. 18 shows a pitch of a scanning line in the sub scan direction in the third embodiment.
Figure 20:
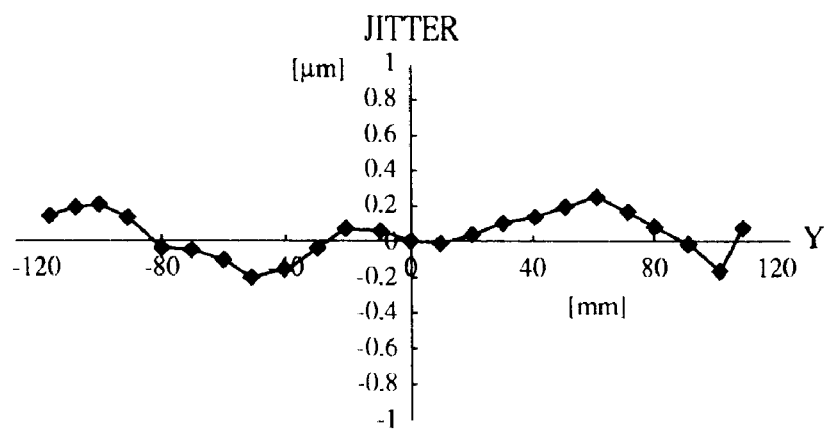
FIG. 20 shows positional variations from light source to light source in the main scan direction in the third embodiment.
Figure 19A:
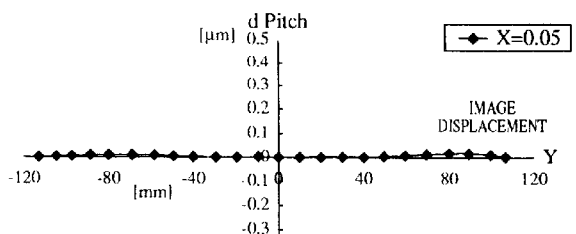
FIGS. 19A–19F show a pitch deviation of the scanning line in the sub scan direction in the third embodiment.
Figure 19B:
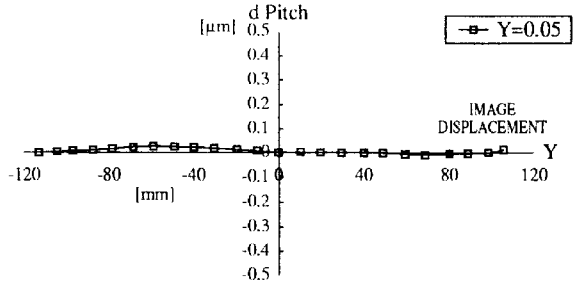
Figure 19C:
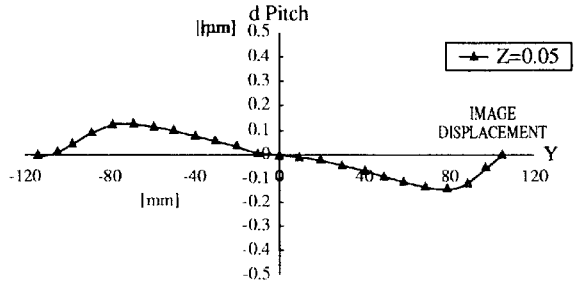
Figure 19D:
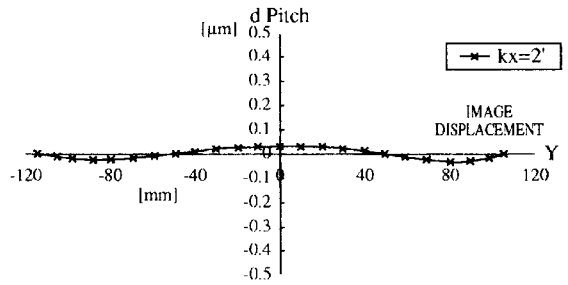
Figure 19E:
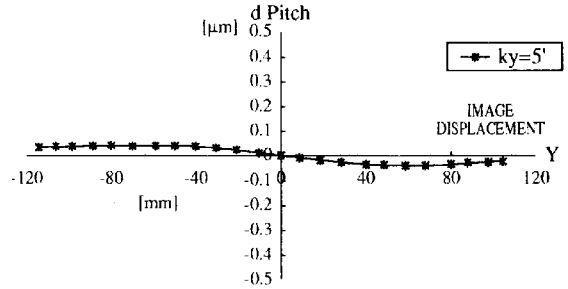
Figure 19F:
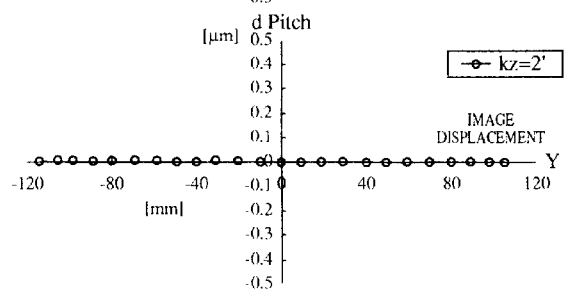
Figure 21A:
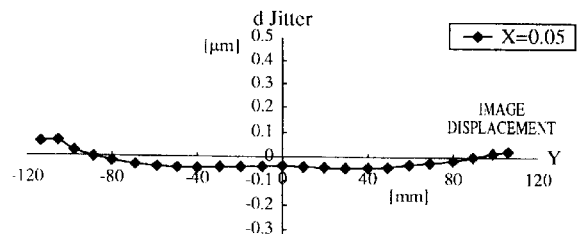
FIGS. 21A–21F show positional variations from light source to light source in the main scan direction in the third embodiment when optical elements are decentered.
Figure 21B:
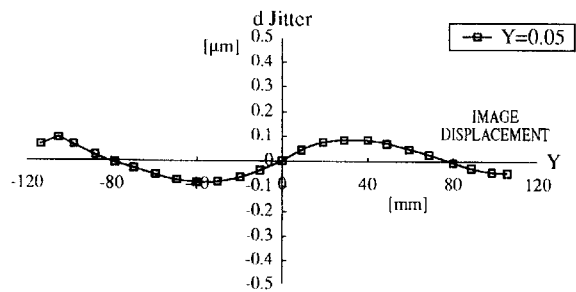
Figure 21C:
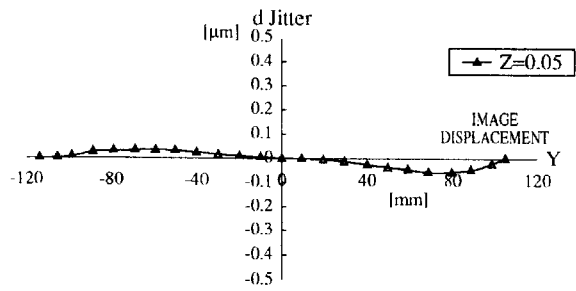
Figure 21D:
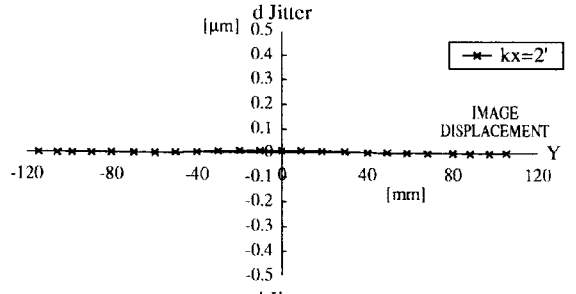
Figure 21E:
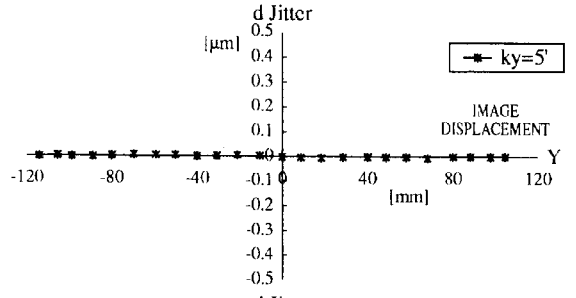
Figure 21F:
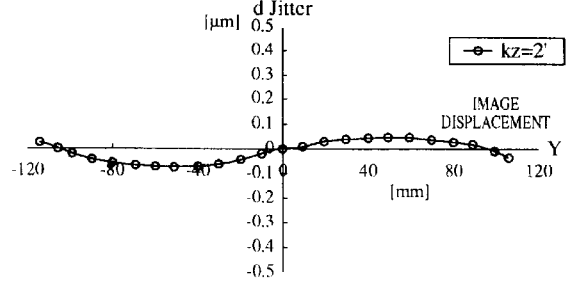

FIG. 18 shows a pitch of a scanning line in the sub scan direction in the third embodiment. As seen from FIG. 18, the pitch becomes substantially uniform. FIG. 20 shows positional variations from light source to light source in the main scan direction with the light beams aligned in the main scan direction. Variations satisfactorily fall within a range of ±0.5 μm.

Unlike the first and second embodiments, the third embodiment employs a plurality of light source elements. In addition to the effect of decentering considered in the first embodiment, the relative positional relationship of displaced focused positions of the light beams of the light source elements become a problem. If the relative positional relationship remains unchanged, the displacements of the focused positions are corrected by adjusting the distance between the light source elements or the timing of light emission of the light sources. When the relative positional relationship changes with scanning, such a method does not work. It is preferred that the configuration of the surface of the optical element is less susceptible to the effect of decentering. As in the first embodiment, the optical surface is preferably almost rotationally symmetrically aspherical in the vicinity of the main scan sectional plane. However, if the optical surface is strictly rotationally symmetrically aspherical in the vicinity of the main scan sectional plane, it becomes difficult to attain required optical performance, and furthermore, correction of the die is also difficult in the molding process. The shapes expressed by the functions of the main scan section and the sub scan section defined in the first embodiment are applied to the optical surfaces of the scanning optical unit 6 in the third embodiment. The radius of curvature in the sub scan sectional plane of the optical surface of the lens 6a facing the deflector 5 is designed so that the ratio of Ra to Rs falls within a range from 0.8 to 1.2 over the entire effective scanning range as shown in FIG. 11. Sufficient performance is assured with the design values as shown in FIGS. 19A–19F and FIGS. 21A–21F, with the effect of decentering thus reduced. FIGS. 19A–19F show a pitch deviation of the scanning line in the sub scan direction with an anamorphically aspherical lens decentered. FIG. 20 shows positional variations from light source to light source in the main scan direction.

In the third embodiment, the optical axis of a light beam transmitted through an optical element having an anamorphically aspherical surface is offset upward by 0.33 mm on the scanning surface with respect to a light beam that may be deflected from the deflector and incident on the scanning surface if no scanning optical unit is employed. This is because the manner in which the curvature of field takes place is different on the right hand side and on the left hand side on the deflection surface, because the rotary polygon mirror having no rotary axis on the deflection surface is used as deflection means. To reduce the offset, the optical element is decentered. The same effect is provided if the optical surface only is decentered.

Figure 22:
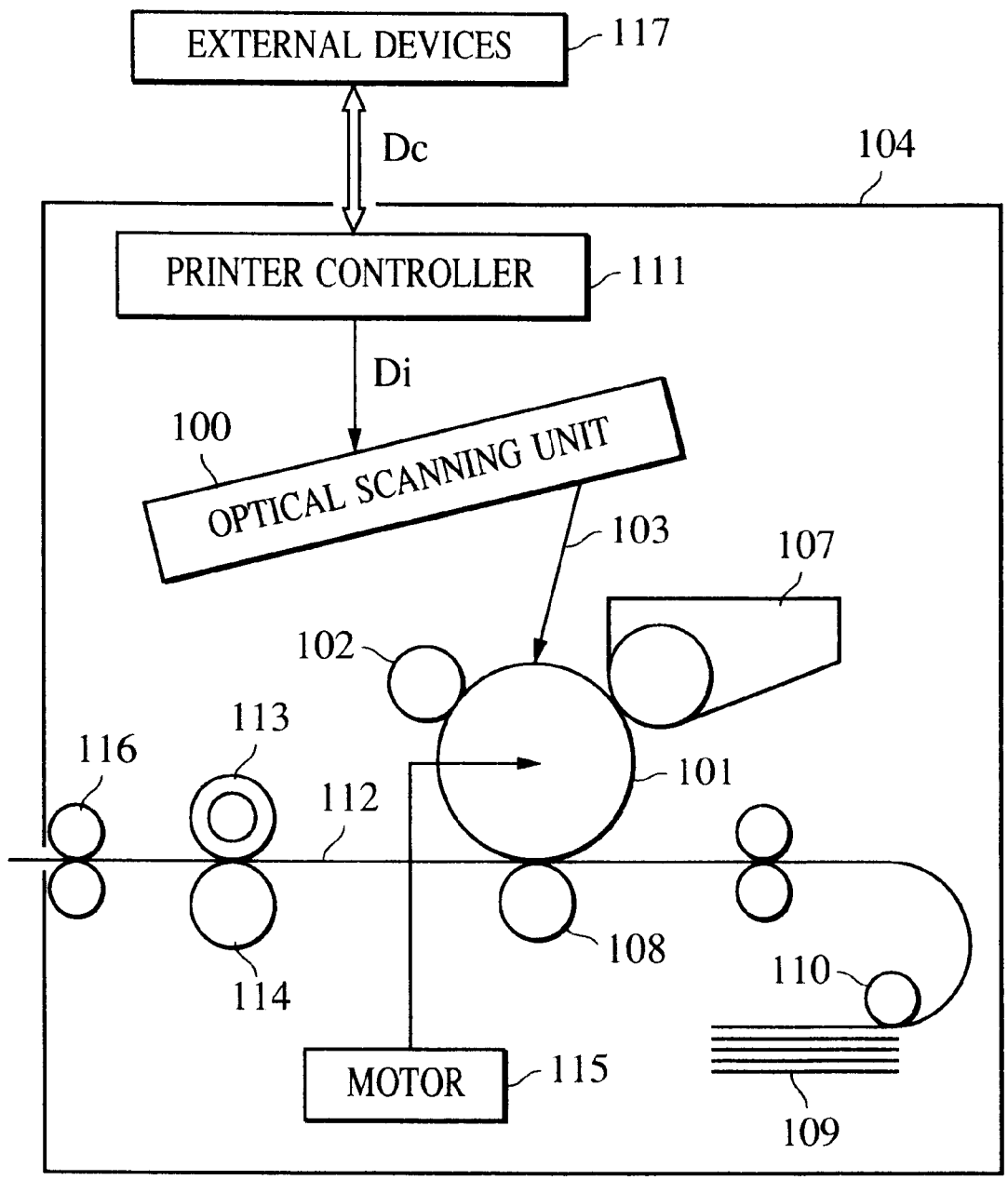
FIG. 22 shows a construction of an electrophotographic printer incorporating the scanning optical system of the present invention (a sub scan cross-sectional view).

FIG. 22 is a sub scan sectional view of a construction of an image forming apparatus 104 incorporating the scanning optical system of the present invention. The image forming apparatus 104 shown in FIG. 22 receives code data Dc from an external device 117 such as personal computer. The code data Dc is converted into image data (dot data) Di by a printer controller 111. The image data Di is input to a scanning optical unit 100 having the construction of one of the first through third embodiments. The scanning optical unit 100 outputs a light beam 103 that has been modulated in response to the image data Di, and the light beam 103 scans across a photoconductive drum 101 in a main scan direction.

The photoconductive drum 101 as an electrostatic latent image bearing body (a photoconductive body) is clockwise rotated by a motor 115. Along with the rotation of the photoconductive drum 101, the photoconductive surface of the photoconductive drum 101 moves relatively with respect to the light beam 103 in a sub scan direction perpendicular to the main scan direction. A charging roller 102 is arranged above the photoconductive drum 101 in a manner such that the charging roller 102 remains in contact with the surface of the photoconductive drum 101 to uniformly charge the surface of the photoconductive drum 101. The scanning optical unit 100 directs the light beam 103 on the surface of the photoconductive drum 101 charged by the charging roller 102.

As already discussed, the light beam 103 has been modulated with the image data Di. When the light beam 103 is directed, an electrostatic latent image is formed on the surface of the photoconductive drum 101. The electrostatic latent image is then developed into a toner image by a development unit 107. The development unit 107 is arranged to be in contact with the photoconductive drum 101 downstream of an irradiation position in a clockwise rotation where the light beam 103 is directed on the photoconductive drum 101.

The toner image developed by the development unit 107 is transferred to a copy sheet as a sheet member below the photoconductive drum 101 by a transfer roller 108. The copy sheet 112 is held in a sheet cassette 109 in front of the photoconductive drum 101 (on the right-hand side in FIG. 22) and is automatically fed. Alternatively, the copy sheet may be manually fed. Arranged at the end of the sheet cassette 109 is a copy sheet feeder roller 110. The copy sheet feeder roller 110 conveys the copy sheet 112 into a transport path of the image forming apparatus 104.

As described above, the copy sheet 112 bearing an unfixed toner image is conveyed to a fixing unit behind the photoconductive drum 101 (on the left-hand side of the image forming apparatus 104). The fixing unit includes a fixing roller 113 including a fixing heater (not shown), and a pressure roller 114 pressed into contact with the fixing roller 113. The copy sheet 112 coming from a transfer unit is pressed in a nip between the fixing roller 113 and the pressure roller 114 while being heated. The unfixed toner image is then fixed onto the copy sheet 112. A discharge roller 116, arranged further behind the fixing roller 113, discharges the copy sheet 112 having the toner image fixed thereon out of the image forming apparatus 104.

The printer controller 111 not only converts data, but also controls various blocks in the image forming apparatus 104 including the motor 115 and a polygon motor in the scanning optical unit, although how these components are controlled is not clearly shown in FIG. 22.

The present invention is applicable to a scanning optical system including a plurality of light source elements, for example, three light source elements or four light source elements.

In accordance with the present invention, in the scanning optical system, a light beam emitted from one or more light source elements is guided to the deflector through the incident optical unit, and the light beam deflected by the deflector is focused and scanned on the scanning surface through the scanning optical system. At least one surface of the optical element forming the scanning optical unit is rotationally asymmetrical, anamorphically aspherical surface in a main scan sectional plane. The radius curvature of the aspherical surface is determined so that the focused position of the light beam is less affected by the decentering of the optical element having the aspherical surface. The scanning optical system is thus less subject to degradation in print quality and less costly. The image forming apparatus incorporating such a scanning optical system is also provided.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A scanning optical system comprising:

at least one light source;

deflection means for deflecting a light beam emitted from said at least one light source;

incident optical means for guiding the light beam from said at least one light source to said deflection means; and scanning optical means, having at least one optical element, for scanning and focusing the light beam, deflected by said deflection means, on a scanning surface, wherein at least one surface of the optical element forming said scanning optical means is an anamorphically aspherical surface in a main scanning plane, and wherein the relationship of 0.8<Ra/Rs<1.2 holds over an entire scanning range, where Ra represents a radius of curvature in a sub scanning plane of the anamorphically aspherical surface in the main scanning plane, and Rs represents a radius of curvature in a sub scanning plane of a surface that results if a generatrix of the anamorphically aspherical surface in the main scanning plane is rotated about an optical axis by 360 degrees.

2. A scanning optical system according to claim 1, wherein the radius of curvature Ra in the sub scanning plane within a distance of 15 mm in a main scan direction from the optical axis satisfies the condition of 0.95<Ra/Rs<1.05.

3. A scanning optical system according to claim 1, wherein said optical element having an anamorphically aspherical surface in the main scanning plane is produced using a molding technique.

4. A scanning optical system according to claim 1, wherein said optical element having an anamorphically aspherical surface in the main scanning plane is a lens.

5. A scanning optical system according to claim 4, wherein said lens having an anamorphically aspherical surface in the main scanning plane is fabricated of a resin material.

6. A scanning optical system according to claim 4, wherein the anamorphically aspherical surface in the main scanning plane is a surface of said lens of said scanning optical means facing said deflection means.

7. A scanning optical system according to claim 4, wherein said scanning optical means includes a plurality of lenses, at least one of which has the anamorphically aspherical surface in the main scan sectional plane.

8. A scanning optical system according to claim 7, wherein the lens constituting said scanning optical means and closest to said deflection means has the anamorphically aspherical surface in the main scanning plane.

9. A scanning optical system according to claim 1, wherein said at least one light source includes one or more light source elements.

10. An image forming apparatus comprising:

a scanning optical system according to one of claims 1 through 9;

a photosensitive body arranged on the scanning surface;

a development unit which develops, into a toner image, an electrostatic latent image which is formed on said photosensitive body by a light beam scanned through said scanning optical system;

a transfer unit which transfers the developed toner image to a sheet member; and a fixing unit which fixes the transferred image onto the sheet member.

11. An image forming apparatus comprising:

a scanning optical system according to one of claims 1 through 9; and a printer controller which converts code data received from an external device into an image signal and then inputs the picture signal to said scanning optical system.

12. A scanning optical system according to claim 1, wherein the radius of curvature Rs satisfies the condition of $1.1 \leq \max|Rs|/\min|Rs| \leq 3.0$.

13. A scanning optical system according to claim 12, wherein the radius of curvature Rs satisfies the condition of $-500 \leq Rs \leq -30$.

* * * * *